United States Patent
Kadambi et al.

(10) Patent No.: US 10,936,796 B2
(45) Date of Patent: Mar. 2, 2021

(54) ENHANCED TEXT SUMMARIZER

(71) Applicant: International Business Machines Corporation, Armonk, NY (US)

(72) Inventors: Balaji Kadambi, Bengaluru (IN); Sharath Kumar Rudrapatna Krishnarao, Bangalore (IN); Manjula Golla Hosurmath, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/400,059

(22) Filed: May 1, 2019

(65) Prior Publication Data
US 2020/0349222 A1  Nov. 5, 2020

(51) Int. Cl.
G06F 17/20 (2006.01)
G06F 40/166 (2020.01)
G06F 40/205 (2020.01)
G06F 40/289 (2020.01)

(52) U.S. Cl.
CPC .......... G06F 40/166 (2020.01); G06F 40/205 (2020.01); G06F 40/289 (2020.01)

(58) Field of Classification Search
CPC ..... G06F 40/166; G06F 40/205; G06F 40/289
See application file for complete search history.

(56) References Cited

U.S. PATENT DOCUMENTS

| | | | | |
|---|---|---|---|---|
| 5,778,397 | A * | 7/1998 | Kupiec | G06F 16/345 715/243 |
| 6,963,830 | B1 * | 11/2005 | Nakao | G06F 16/345 704/1 |
| 7,752,204 | B2 | 7/2010 | Kao | |
| 7,783,640 | B2 * | 8/2010 | Liao | G06F 16/345 707/736 |
| 7,809,548 | B2 | 10/2010 | Mihalcea | |
| 8,176,418 | B2 * | 5/2012 | McKeown | G06Q 10/10 715/254 |

(Continued)

OTHER PUBLICATIONS

"The guide to tackle with the Text Summarization", GitHub, icoxfog417, Latest commit 4f2d7c6 on Dec. 3, 2018, 11 pages, <https://github.com/icoxfog417/awesome-text-summarization>.
Allahyari et al., "Text Summarization Techniques: A Brief Survey", arXiv:1707.02268v3 [cs.CL] Jul. 28, 2017, 9 pages.
Bharti et al., "Automatic Keyword Extraction for Text Summarization: A Survey", National Institute of Technology, Rourkela, Odisha, India, Feb. 8, 2017, 12 pages.

(Continued)

*Primary Examiner* — Shahid K Khan
(74) *Attorney, Agent, or Firm* — William E. Schiesser (57) ABSTRACT

An enhanced text summarizer is provided. A processor receives a request to generate a summarization of a text. A processor determines at least one domain associated with the text. A processor extracts one or more features from the text. A processor determines one or more relevance scores for the one or more features based on the determined at least one domain associated with the text. A processor determines a feature-based ranking for one or more sentences of the text. A processor determines an extractive-based ranking for one or more sentences of the text. A processor merges at least one sentence of the feature-based ranking and at least one sentence of the extractive-based ranking of the text. A processor generates the summarization of the text based on the merged the at least one sentence of the feature-based ranking and the at least one sentence of the extractive-based ranking of the text.

15 Claims, 4 Drawing Sheets

(56) References Cited

U.S. PATENT DOCUMENTS

| | | | |
|---|---|---|---|
| 8,612,445 B2* | 12/2013 | Hatami-Hanza | G06F 16/278 |
| | | | 707/737 |
| 9,020,808 B2 | 4/2015 | Branton | |
| 9,727,556 B2* | 8/2017 | Wang | G06F 40/40 |
| 9,886,501 B2 | 2/2018 | Krishnamurthy et al. | |
| 2002/0078090 A1* | 6/2002 | Hwang | G06F 16/345 |
| | | | 715/201 |
| 2002/0138528 A1* | 9/2002 | Gong | G06Q 50/24 |
| | | | 715/254 |
| 2005/0278325 A1* | 12/2005 | Mihalcea | G06F 16/3344 |
| 2007/0130257 A1 | 6/2007 | Bedi | |
| 2010/0287162 A1 | 11/2010 | Shirwadkar | |
| 2014/0195897 A1* | 7/2014 | Balinsky | G06F 16/345 |
| | | | 715/254 |
| 2017/0228369 A1* | 8/2017 | Zelenkov | G06F 40/30 |

OTHER PUBLICATIONS

Chuang et al., "Extracting Sentence Segments for Text Summarization: A Machine Learning Approach", SIGIR 2000, Jul. 2000, Athens, Greece, © 2000 ACM, pp. 152-159.

Khatri et al., "Abstractive and Extractive Text Summarization using Document Context Vector and Recurrent Neural Networks", KDD'18 Deep Learning Day, Aug. 2018, London, UK, © 2018 Copyright held by the owner/author(s), 10 pages.

Trappey et al., "Automatic Patent Document Summarization for Collaborative Knowledge Systems and Services", J Syst Sci Syst Eng (Mar. 2009) 18(1): 071-094, © Systems Engineering Society of China & Springer-Verlag 2009.

\* cited by examiner

ENHANCED TEXT SUMMARIZER

BACKGROUND OF THE INVENTION

The present invention relates generally to the field of article or text summarization, and more particularly to feature extraction.

Article or text summarization is the process of shortening a text document to provide a condensed version of the original document, yet still preserving important information of the article to a user. Text summarizers select the most relevant parts of a text and combine the parts into a short abstract of the original document. Typically, text summarizers utilize graph based approach or latent semantic analysis approach to determine the summarization of the article.

SUMMARY

Embodiments of the present invention provide a method, system, and program product to enhance text summarizers. A processor receives a request to generate a summarization of a text. A processor determines at least one domain associated with the text. A processor extracts one or more features from the text. A processor determines one or more relevance scores for the one or more features based on the determined at least one domain associated with the text. A processor determines a feature-based ranking for one or more sentences of the text. A processor determines an extractive-based ranking for one or more sentences of the text. A processor merges at least one sentence of the feature-based ranking and at least one sentence of the extractive-based ranking of the text. A processor generates the summarization of the text based on the merged the at least one sentence of the feature-based ranking and the at least one sentence of the extractive-based ranking of the text.

DETAILED DESCRIPTION

While prior solutions to text summarization are known, they typically are performed using statistical-based graph analysis or latent semantic analysis. Prior solutions typically extract sentences from a body of text or article. Prior solutions typically compare each sentence of the article to one another, generating a similarity score or other metric for each pair of extracted sentences. Sentences with higher similarity scores when compared to other sentences in the graph are then selected for use in the summarization of the article. However, such prior solutions do not account for an understanding of the content provided within the text. Extractive approaches use the semantic structures of the words and sentences in the text to construct a summary. Such prior solutions do not incorporate any semantic understanding of the content or knowledge to determine the context presented in the text.

Embodiments of the present invention recognize that prior solutions can be improved by merging a feature-based summarization of the article with extractive-based summarization algorithms. Embodiments of the present invention provide a method to extract relevant features and rank the extracted features by utilizing Natural Language Processing (NLP) of the text to be summarized. Furthermore, embodiments of the present invention provide machine learning (ML) and unsupervised feedback techniques to provide additional improvements to prior solutions of text summarization.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
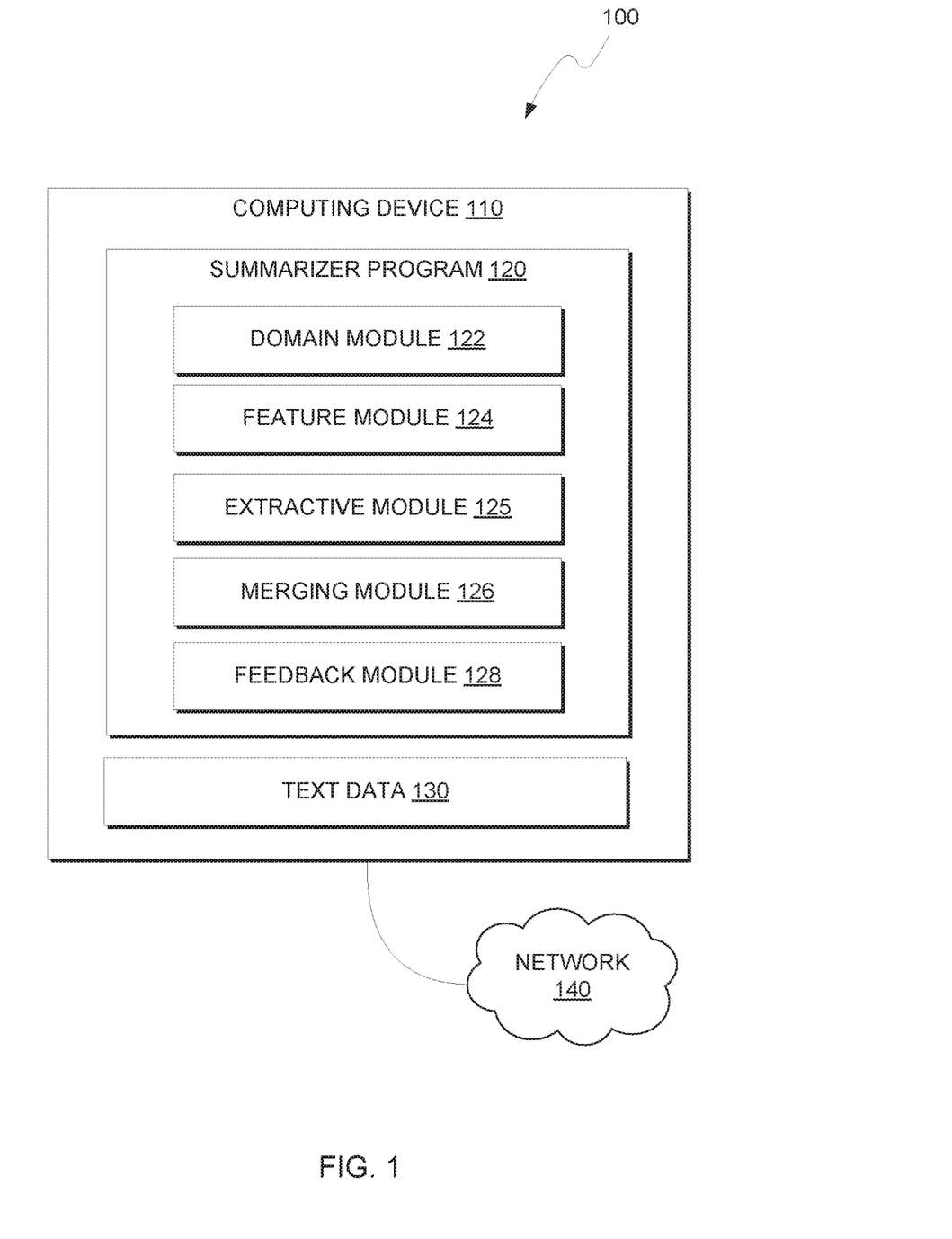
FIG. 1 is a functional block diagram illustrating a networked environment, in accordance with an embodiment of the present invention.

The present invention will now be described in detail with reference to the Figures. FIG. 1 is a functional block diagram illustrating networked environment, generally designated 100, in accordance with one embodiment of the present invention. Networked environment 100 includes computing device 110 connected over network 140. Computing device 110 includes summarizer program 120 and text data 130. Summarizer program 120 includes domain module 122, feature module 124, extractive module 125, merging module 126 and feedback module 128.

In various embodiments of the present invention, computing device 110 is a computing device that can be a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to text data 130 is capable of executing summarizer program 120. Computing device 110 may include internal and external hardware components, as depicted and described in further detail with respect to FIG. 4.

In this exemplary embodiment, summarizer program 120 and text data 130 are stored on computing device 110 However, in other embodiments, summarizer program 120 and text data 130 may be stored externally and accessed through a communication network, such as network 140. Network 140 can be, for example, a local area network (LAN), a wide area network (WAN) such as the Internet, or a combination of the two, and may include wired, wireless, fiber optic or any other connection known in the art. In general, network 140 can be any combination of connections and protocols that will support communications between computing device 110 and any other computing device (not shown), in accordance with a desired embodiment of the present invention.

In various embodiments, summarizer program 120 generates a summary, abstract, or otherwise paraphrased or shortened arrangement of a body of text. Text data 130 includes various bodies of text such as, but not limited to, news articles, research papers, books, or any other equivalent body of text. As will be discussed herein, summarizer program 120 retrieves a body of text from text data 130. Based on the various methods and techniques discussed herein, summarizer program 120 generates a summary of the body of text that is of a target or requested length, typically shorter in length than the original body of text such as a few sentences.

In various embodiments, summarizer program 120 receives a request to generate a summary of a body of text. The request includes the body of text or any indication, link, pointer or other information directing summarizer program 120 to a location to retrieve the body of text. In some embodiments, the body of text is uploaded or downloaded to text data 130. In other embodiments, summarizer program 120 retrieves the body of text from another storage location connected to network 140. In such embodiments, summarizer program 120 may retain, permanently or temporally, a copy of the body of text in text data 130.

In various embodiments, summarizer program 120 generates a summary for a body of text by determining two types of rankings for the sentences of the body of text: an extractive-based ranking and a feature-based ranking. Summarizer program 120 merges both the feature and extractive-based rankings to generate a summary for a body of text. Additionally, summarizer program 120 provides a machine-learning (ML) based feedback to improve the quality of summaries generated by summarizer program 120.

In various embodiments, summarizer program 120 determines a feature-based ranking of the body of text to be summarized. Summarizer program 120 includes domain module 122 and feature module 124. Both domain module 122 and feature module 124 utilize a natural language processing (NLP) algorithm to determine the both the syntactical and semantical meaning of the body of text. Domain module 122 determines a domain, category topic or subject matter associated with the body of text. In some embodiments, the domain module 122 of summarizer program 120 identifies more than one domain associated with the body of text.

In various embodiments, domain module 122 determines a domain associated with the body of text. In some embodiments, domain module 122 determines a domain based on a NLP of the body of text. For example, based on the topics discussed in the text, domain module 122 determines a domain associated with the body of text. In some embodiments, domain module 122 also includes metadata regarding the body of text in the determination of the domain for the body of text. In some embodiments, based on input from feedback module 128, domain module 122 updates or changes one or more classification models.

In various embodiments, feature module 124 extracts one or more features from the body of text. Based on the identified domain or category of the text, feature module 124 extracts the most relevant features of the text in regard to the domain associated with the text. For example, feature module 124 extracts features associated with places or locations when an blog post summarizing a person's vacation (e.g., "Travel" Domain) is being summarized by summarizer program 120.

In various embodiments, feature module 124 ranks the extracted features of the body of text. Based on the determined domain of the text, feature module 124 ranks features based on the relevancy or relevance score of the discussed feature for the text within the determined domain by domain module 122. Feature module 124 selects a predetermined number of features from the extracted features of the text. In various embodiments, feature module 124 determines a feature-based ranking of the body of text. The extracted feature each have a relevance score for the determined domain of the text. Based on the relevance score, feature module 124 ranks or orders the features with the more relevant features being ranked higher. Based on the determined domain of the text and ranking of features, feature module 124 selects a predetermined number of higher or more relevant features from the text based on the domain. In some embodiments, based on input from feedback module 128, feature module 124 increases or decreases the determined number of features to be extracted.

In various embodiments, summarizer program 120 generates an extractive-based ranking of the body of text. Extractive module 125 identifies and extracts each sentence from the body of text. Extractive module 125 generates a ranking of each sentence by utilizing one or more of the following extractive based text summarization algorithms: a statistical-based, a graph-based or a latent-semantic-based algorithm. One of ordinary skill in the art will appreciate that any unsupervised extractive text summarization algorithm may be used without deviating from the invention.

As a non-limiting example, extractive module 125 performs an extractive-based extractive summarization of the text for each sentence. The graph comprises vertices and edges. Each node, vertex, or point in the graph represents an extracted sentence from the body of text. Extractive module 125 compares each node (i.e., each sentence) which represent the edges or paths of the graph. Based on the various comparisons, Extractive module 125 ranks each node based on a summation or average of each edges value connected to the node. In some embodiments, extractive module 125 compares each node utilizing a similarity metric. Extractive module 125 extracts keywords from each node (i.e., sentence). For example, articles (e.g., "the", "an", etc. and other words are removed from the nodes, leaving only keywords of the sentence in the node. Extractive module 125 compares each nodes keyword to determine a similarity of the two nodes. Extractive module 125 gives a higher rank to nodes or sentences with keywords that are similar to other keywords in separate nodes or frequently repeated in the other nodes.

Based on the feature-based ranking and the extractive-based ranking of the body of text, summarizer program 120 merges the two rankings to generate a summarization of the body of text. Based on a target length for the summarization (denoted as "M" length in sentences), determines a mixture of feature-based ranking and extractive-based ranking to be utilized. For a given domain or category, merging module 126 determines a number of features to include from the feature-based ranking of feature module 124. For example, based on the domain of the text, merging module 126 determines that the top or highest ranking features are to be selected for inclusion in the summarization of the text, denoted as "N" herein as the number features to be included in the summary based on the determined domain.

In various embodiments, merging module 126 identifies the sentences containing the top N features, extracting the first sentence in the text containing the feature, to identify the first "X" sentences to discuss each top feature N. In some scenarios, the number of features N may be equal to the number of extracted sentences X. However, one of ordinary skill will appreciate that X may be less than N in scenarios where a sentence includes multiple relevant features.

In various embodiments, merging module 126 selects the top "Y" sentences based on a similarity score generated by extractive module 125. Y is the remaining sentences between the requested summary length M once the first X sentences from feature module 124 have been determined (i.e., Y=M–X). Based on the top extractive-based rankings of the text, merging module 126 selects the top Y associated with the highest ranking nodes in the graph. In some embodiments, one sentence may contain multiple features identified in the top N features. In such scenarios, the merged summary will be shorter than the targeted length M since a single sentence contains two or more features. In such scenarios, merging module 126 compares the merged summary's length to the targeted length received in the request. Based on the how far under target the length of the merged summary, merging module 126 increases either the number of sentences from the feature module 124 or extractive module 125 to ensure the output length of the summary is equal to the target length received in the request. In various embodiments, summarizer program 120 provides the merged summary to the user requesting the summarization of the body of text.

In various embodiments, summarizer program 120 includes feedback module 128. Feedback module 128 includes a summary evaluation module, such as Recall-Oriented Understudy for Gisting Evaluation (ROGUE) or other metric for evaluating summaries or translations of a text. One of ordinary skill in the art will appreciate that any summary evaluation module or algorithm may be used by feedback module 128 without deviating from the innovation. Feedback module 128 determines a score for the summary. Based on the score, feedback module 128 updates domain module 122 or feature module 124. In one example for higher ranking summaries, feedback module 128 updates feature module 124 to increase the relevancy scoring of top features compared to lower ranking features for the identified domain. In another example for lower ranking summaries, feedback module 128 updates domain module 122 to give a higher weight to lower ranked or alternative domains or updates feature module 124 to give higher relevance to lower ranked features for the identified domain. The summarizer program 120 is executed again to check for improvement in summary ranking scores to keep the updates made to the domain module 122 or the feature module 124.

Figure 2:
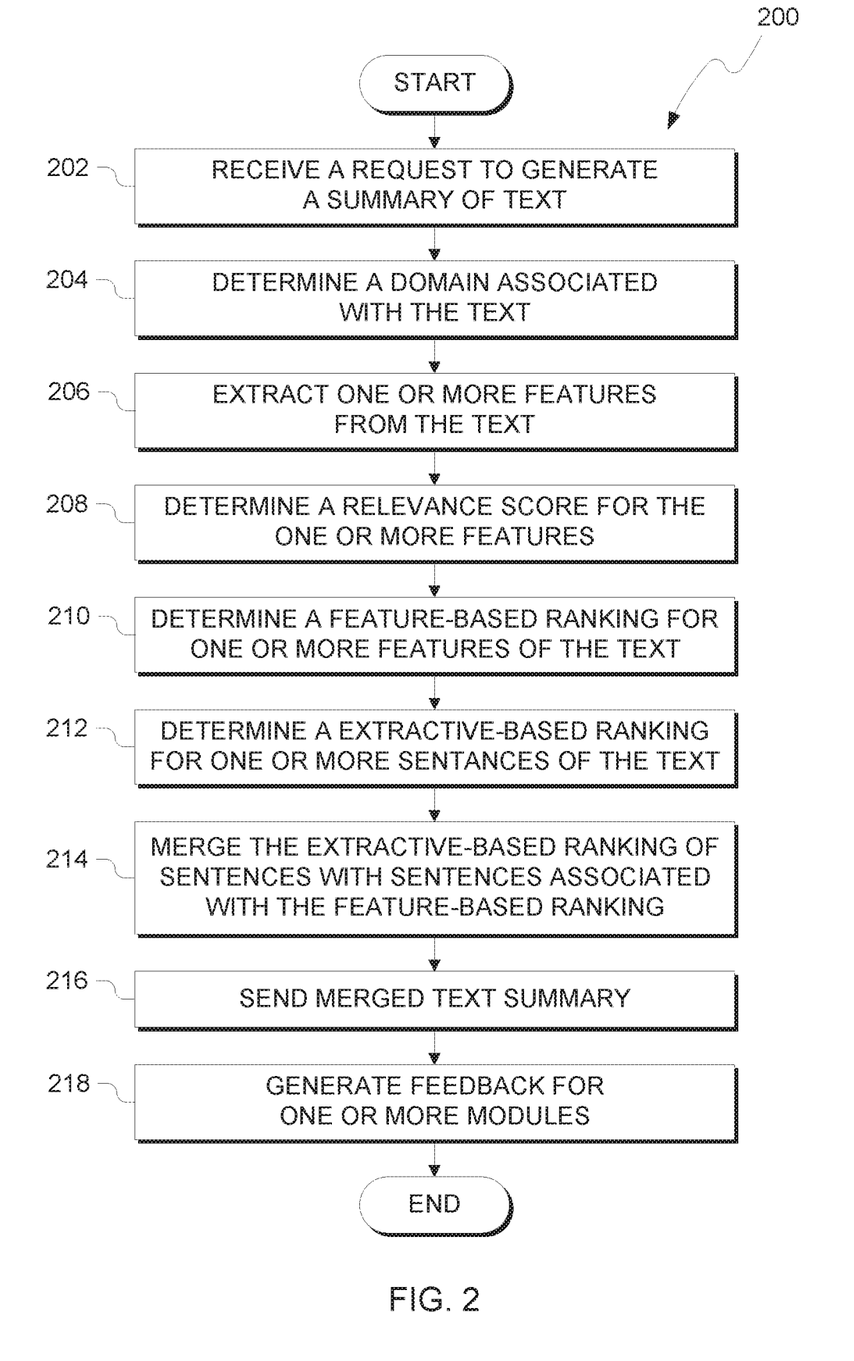
FIG. 2 illustrates operational processes of a summarizer program, on a computing device within the environment of FIG. 1, in accordance with an embodiment of the present invention.

FIG. 2 illustrates operational processes, generally designated 200, of summarizer program 120, on computing device 100 within the environment of FIG. 1. Process 202, summarizer program 120 receives a request to generates a summary for a body of text. In some embodiments, summarizer program 120 receives a target length in sentences, word count or the like, where the target length indicates a requested summary length for a summary of the body of text.

In process 204, summarizer program 120 determines a domain associated with the body of text to be summarized. In various embodiments, domain module 122 performs NLP to the body of text to identify a domain, subject or field related to the body of text. In some embodiments, domain module 122 retrieves metadata, such as, but not limited to, source or citation, for use in determining a domain associated with the text.

In process 206, summarizer program 120 extracts one or more features from the text. Feature module 124 performs NLP to determine the features and other topics presented in the text. In process 208, feature module 124 determines a relevancy score for each extracted feature. Feature module 124 assigns higher relevancy scores for features that are more commonly discussed within the identified domain in process 204, while less relevant features within the domain are given lower relevancy scores. In process 210, summarizer program 120 determines a feature-based ranking of the features extracted in process 206, based on the relevancy scores determined in process 208, where the more relevant features discussed in the text are ranked higher than lesser relevant features.

In process 212, summarizer program 120 determines an extractive-based ranking of the sentences of the body of text. Example extractive-based ranking of the text include, but are not limited to, statistical-based, graph-based or latent-semantic-based algorithms. In one example of an extractive-based ranking of the text, summarizer program 120 creates a graph where each node is mapped to each sentence of the text. Summarizer program 120 compares each node or sentence to the remaining sentences to determine a similarity score for each comparison. The sentences with the higher similarity scores are assigned a higher rank than sentences with less similar wording, topics or keywords. Summarizer program 120 combines the similarity score for each sentence, ranking the sentences based on the combined similarity score of a sentence compared to the other sentences in the text.

In process 214, summarizer program 120 merges the feature-based ranking and extractive-based ranking of the text determines in processes 210 and 212, respectively. In some embodiments, summarizer program 120 receives a target length M of the summary in the request of process 202. In other embodiments, summarizer program 120 determines a target length of the summary based on domain-based analysis of the text. Based on the domain determined in process 204, summarizer program 120 selects a predetermined amount of features from the feature-based ranking N. Summarizer program 120 selects the top X sentences containing the top N features in the feature-based ranking to be included in the merged text summary. Summarizer program 120 selects the top Y sentences from the extractive-based ranking, where $Y=M-X$. If the resulting merged summary is below the target length, then summarizer program 120 increases Y to include more sentences for the extractive-based ranking to achieve the target length received in process 202.

In process 216, summarizer program 120 sends the merged text summary to the user. In process 218, summarizer program 120 evaluates the merged summary using one or more summary evaluation techniques such as ROGUE. Based on the evaluation, summarizer program 120 updates one or more models associated with domain module 122 or feature module 124.

Figure 3:
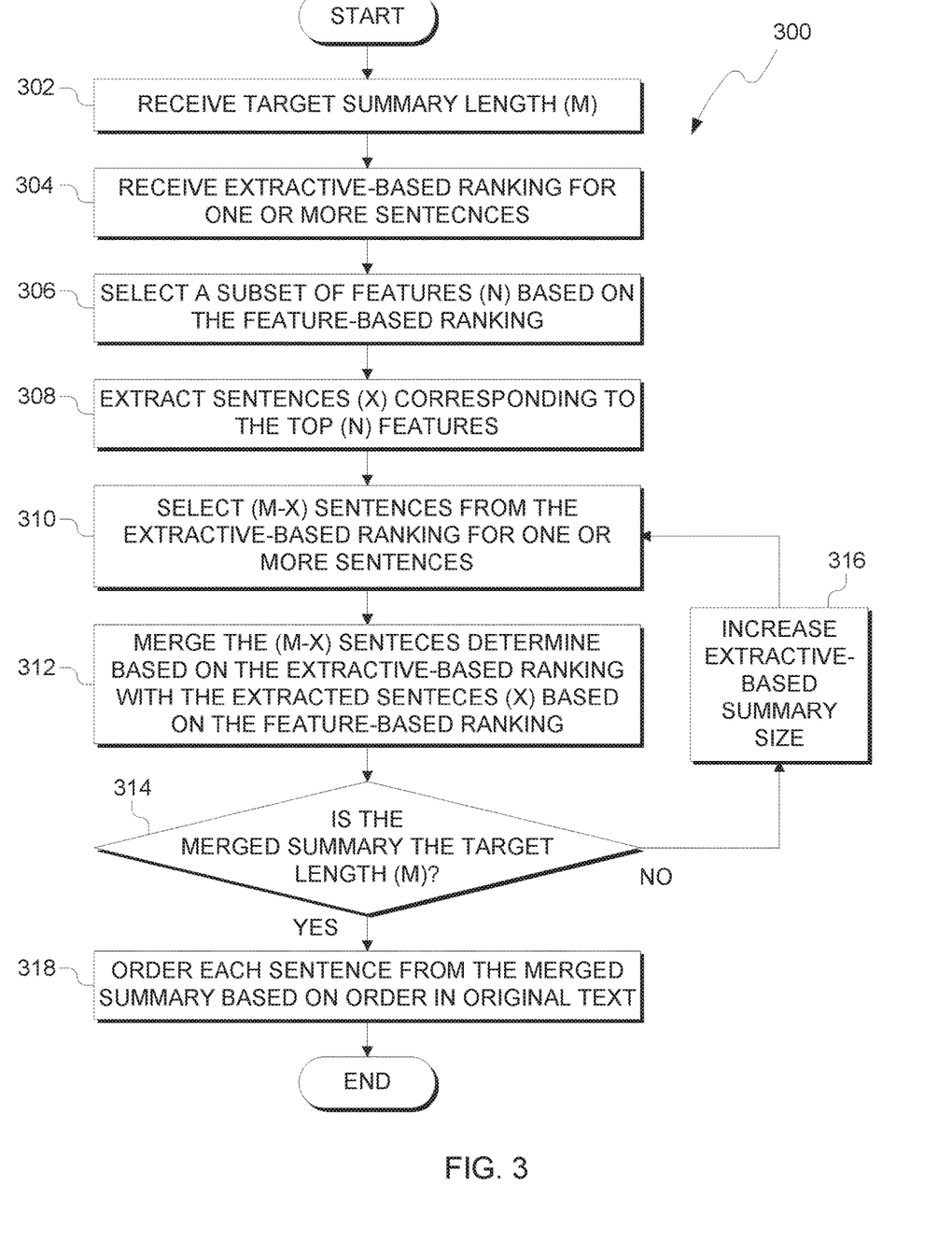
FIG. 3 illustrates operational processes of a merging module for a summarizer program, on a computing device within the environment of FIG. 1, in accordance with an embodiment of the present invention.

FIG. 3 illustrates operational processes, generally designated 300, of merging module 126 for summarizer program 120, on computing device 100 within the environment of FIG. 1. In process 302, merging module 126 of summarizer program 120 receives a target summary length. In the following, sentences are discussed regarding the target length of a summary. One of ordinary skill in the art will appreciate that any metric of summary length may be used without deviating from the invention such as, but not limited to, word count, letter count or time length for summaries based off of transcriptions of audio recordings.

In process 304, merging module 126 of summarizer program 120 receives an extractive-based ranking for the one or more sentences of the text to be summarized, as discussed in process 212 of FIG. 2. In process 306, merging module 126 of summarizer program 120 selects a subset of features based on the features identified in the feature-based ranking of process 210 of FIG. 2. In various embodiments, merging module 126 of summarizer program 120 determines a number or amount of features to select for inclusion in the summary, referred to herein as N. In some embodiments, merging module 126 of summarizer program 120 determines the amount of feature based on a domain or subject matter associated with the text or other information indicative of the subject matter provided in the text. In some embodiments, feedback module 128 of summarizer program 120 changes or updates the number of selected features (e.g., increasing or decreasing N for a given subject or domain associated with the text) for a subject or domain based on one or more scores or reviews of subsequent summaries in the domain.

In process 308, merging module 126 of summarizer program 120 extracts the sentences (X) associated with the top features (N) for the text to be summarized. In some embodiments, merging module 126 extracts the first sentence to appear in the text that is associated with each feature of the top features (N). In some scenarios, two or more features may be first presented in a single sentence. As such the number of extracted sentences (X) may not be equal to the number of features (N). In other embodiments, merging module 126 evaluates each sentence in the text that mentions a given feature. In such embodiments, merging module 126 selects the most relevant sentence that discusses the feature.

In process 310, merging module 126 of summarizer program 120 selects the remaining sentences for the summary from the extractive-based ranking of sentences for the text (i.e., M−X where M is the target length and X is the number of sentences extracted from the feature-based ranking of the text). Based on the extractive-based ranking of the text, the top (M−X) sentences are selected. In process 312, merging module 126 merges the (M−X) sentences from process 310 with the extracted sentences X from process 308.

In decision process 314, merging module 126 identifies if the merged (M−X) and X sentences are equal to target length M received in process 302. In some scenarios merging module 126 may include a sentence in both the extractive-based ranking derivation of the (M−X) sentences from process 310 and the feature-based ranking derivation of extracted sentences X from process 308. In such scenarios, the final summary length will be one sentence less than the target length. In such scenarios (NO branch of decision process 314), merging module 126 proceeds process 316 which increase the extractive-based target of (M−X) by one or however many sentences short the summary length in decision process 314 is from received target length in process 302. Merging module 126 then proceeds to increase the target extractive-based ranking of sentences to account for the discrepancy between the target length and current length. When the merged feature-based and extractive-based rankings are equal in length to the target length received in process 302 (YES branch of process 314), then merging module 126 generates a summary of the target length. In process 318, merging module 126 orders each sentence from both rankings to match the original order of sentences in the text.

Figure 4:
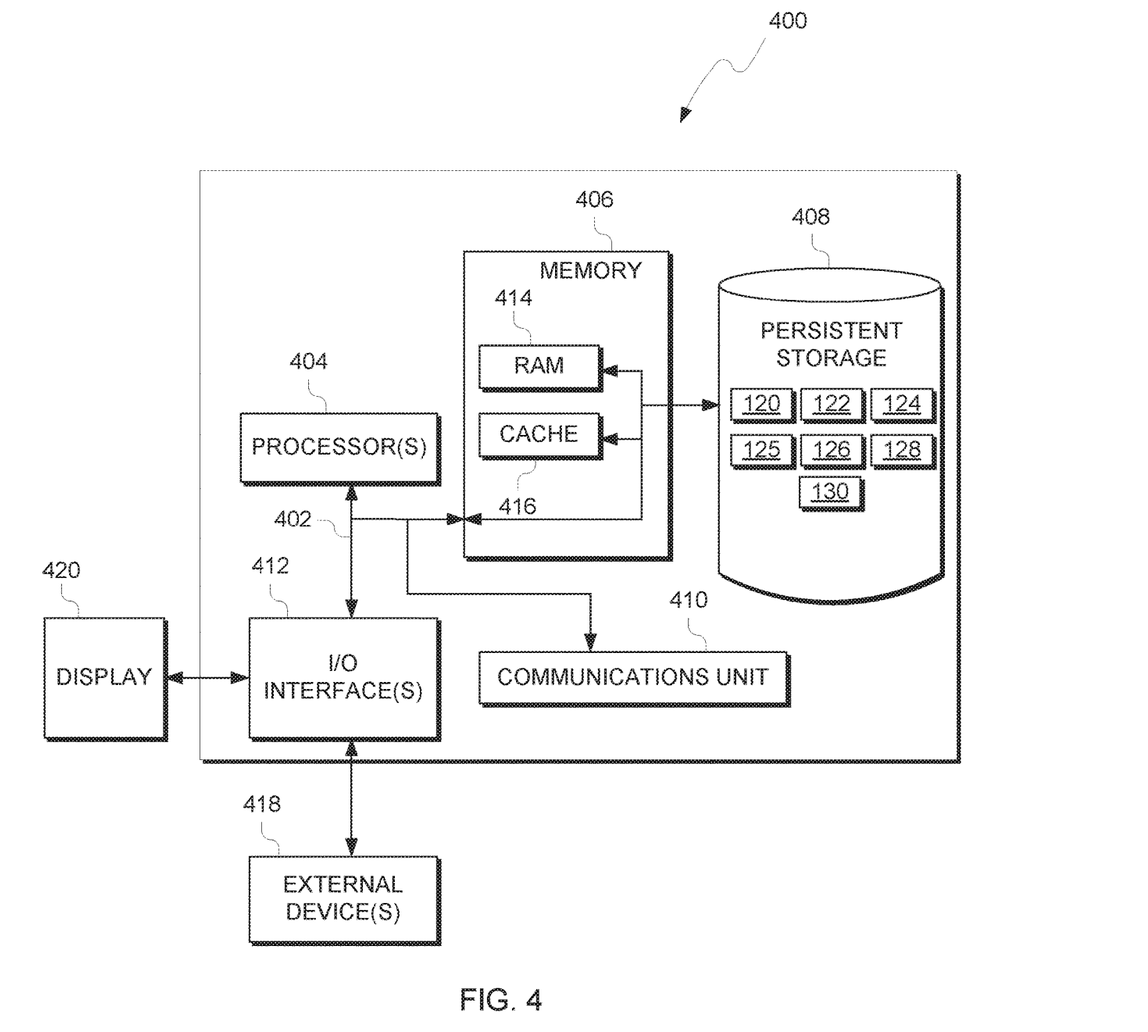
FIG. 4 depicts a block diagram of components of the computing device executing a summarizer program, in accordance with an exemplary embodiment of the present invention.

FIG. 4 depicts a block diagram, 400, of components of computing device 110, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Summarizer program 120 and text data 130 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 140. In these examples, communications unit 410 includes one or more network interface cards. Communications unit 410 may provide communications through the use of either or both physical and wireless communications links. Summarizer program 120 and text data 130 may be downloaded to persistent storage 408 through communications unit 410.

I/O interface(s) 412 allows for input and output of data with other devices that may be connected to computing device 110. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., summarizer program 120 and text data 130, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method comprising:

receiving, by one or more processors, a request to generate a summarization of a text, wherein the request to generate the summarization of the text includes a target length;

determining, by the one or more processors, at least one domain associated with the text;

extracting, by the one or more processors, one or more features from the text;

determining, by the one or more processors, one or more relevance scores for the one or more features based, at least in part, on the determined at least one domain associated with the text;

determining, by the one or more processors, a feature-based ranking for one or more sentences of the text;

determining, by the one or more processors, an extractive-based ranking for one or more sentences of the text;

selecting, by the one or more processors, a feature-based amount of sentences from the text based, at least in part, on the feature-based ranking for the one or more sentences of the text;

selecting, by the one or more processors, an extractive-based amount of sentences from the text based, at least in part, on the extractive-based ranking for one or more sentences of the text, wherein the extractive-based amount and the feature-based amount of sentences are equal to the target length received in the request to generate the summarization of the text;

merging, by the one or more processors, (i) at least one sentence of the feature-based ranking and (ii) at least one sentence of the extractive-based ranking of the text; and generating, by the one or more processors, the summarization of the text based, at least in part, on the merged (i) the at least one sentence of the feature-based ranking and (ii) the at least one sentence of the extractive-based ranking of the text.

2. The method of claim 1, the method further comprising:

determining, by the one or more processors, a quality score for the generated summarization of the text; and updating, by the one or more processors, one or more feature-based models based, at least in part, on the quality score for the generated summarization of the text.

3. The method of claim 1, wherein the feature-based amount of sentences is based, at least in part, on the at least one domain of the text.

4. The method of claim 3, wherein updating the one or more feature-based models further comprises:

updating, by the one or more processors, the one or more feature-based models based, at least in part, on the quality score for the generated summarization of the text, wherein the feature-based amount of sentences is updated for the at least one domain of the text.

5. The method of claim 1, wherein the generated summarization of the text maintains a sentence order of the text.

6. A computer program product comprising:

one or more computer-readable storage media and program instructions stored on the one or more computer-readable storage media, the program instructions comprising:

program instructions to receive a request to generate a summarization of a text, wherein the request to generate the summarization of the text includes a target length;

program instructions to determine at least one domain associated with the text;

program instructions to extract one or more features from the text;

program instructions to determine one or more relevance scores for the one or more features based, at least in part, on the determined at least one domain associated with the text;

program instructions to determine a feature-based ranking for one or more sentences of the text;

program instructions to determine an extractive-based ranking for one or more sentences of the text;

program instructions to select a feature-based amount of sentences from the text based, at least in part, on the feature-based ranking for the one or more sentences of the text;

program instructions to select a extractive-based amount of sentences from the text based, at least in part, on the extractive-based ranking for one or more sentences of the text, wherein the extractive-based amount and the feature-based amount of sentences are equal to the target length received in the request to generate the summarization of the text;

program instructions to merge (i) at least one sentence of the feature-based ranking and (ii) at least one sentence of the extractive-based ranking of the text; and program instructions to generate the summarization of the text based, at least in part, on the merged (i) the at least one sentence of the feature-based ranking and (ii) the at least one sentence of the extractive-based ranking of the text.

7. The computer program product of claim 6, the program instructions further comprising:

program instructions determine a quality score for the generated summarization of the text; and program instructions update one or more feature-based models based, at least in part, on the quality score for the generated summarization of the text.

8. The computer program product of claim 6, wherein the feature-based amount of sentences is based, at least in part, on the at least one domain of the text.

9. The computer program product of claim 8, wherein program instructions to update the one or more feature-based models further comprises:

program instructions to update the one or more feature-based models based, at least in part, on the quality score for the generated summarization of the text, wherein the feature-based amount of sentences is updated for the at least one domain of the text.

10. The computer program product of claim 6, wherein the generated summarization of the text maintains a sentence order of the text.

11. A computer system comprising:

one or more computer processors;

one or more computer readable storage media; and program instructions stored on the computer readable storage media for execution by at least one of the one or more processors, the program instructions comprising:

program instructions to receive a request to generate a summarization of a text wherein the request to generate the summarization of the text includes a target length;

program instructions to determine at least one domain associated with the text;

program instructions to extract one or more features from the text;

program instructions to determine one or more relevance scores for the one or more features based, at least in part, on the determined at least one domain associated with the text;

program instructions to determine a feature-based ranking for one or more sentences of the text;

program instructions to determine an extractive-based ranking for one or more sentences of the text;

program instructions to select a feature-based amount of sentences from the text based, at least in part, on the feature-based ranking for the one or more sentences of the text;

program instructions to select a extractive-based amount of sentences from the text based, at least in part, on the extractive-based ranking for one or more sentences of the text, wherein the extractive-based amount and the feature-based amount of sentences are equal to the target length received in the request to generate the summarization of the text;

program instructions to merge (i) at least one sentence of the feature-based ranking and (ii) at least one sentence of the extractive-based ranking of the text; and program instructions to generate the summarization of the text based, at least in part, on the merged (i) the at least one sentence of the feature-based ranking and (ii) the at least one sentence of the extractive-based ranking of the text.

12. The computer system of claim 11, the program instructions further comprising:

program instructions determine a quality score for the generated summarization of the text; and program instructions update one or more feature-based models based, at least in part, on the quality score for the generated summarization of the text.

13. The computer system of claim 11, wherein the feature-based amount of sentences is based, at least in part, on the at least one domain of the text.

14. The computer system of claim 13, wherein program instructions to update the one or more feature-based models further comprises:

program instructions to update the one or more feature-based models based, at least in part, on the quality score for the generated summarization of the text, wherein the feature-based amount of sentences is updated for the at least one domain of the text.

15. The computer system of claim 11, wherein the generated summarization of the text maintains a sentence order of the text.

* * * * *